United States Patent [19]

Turner

[11] Patent Number: 5,505,475
[45] Date of Patent: Apr. 9, 1996

[54] ATTACHABLE APPARATUS FOR UNLOCKING ADJUSTABLE SUSPENSIONS

[76] Inventor: Jimmy R. Turner, Rte. #2, Box 345-1, Inola, Okla. 74036

[21] Appl. No.: 350,690

[22] Filed: Dec. 7, 1994

[51] Int. Cl.⁶ .................................................. B62D 33/08
[52] U.S. Cl. .................................... 280/149.2; 180/24.02
[58] Field of Search .................. 280/149.2, 405.1, 280/407, 407.1; 180/24.02, 906

[56] References Cited

U.S. PATENT DOCUMENTS

| | | | |
|---|---|---|---|
| 1,179,115 | 4/1916 | LaVake | 254/342 |
| 2,589,678 | 3/1952 | De Lay | 280/149.2 |
| 2,818,272 | 12/1957 | De Lay | 280/149.2 |
| 2,835,504 | 5/1958 | Acker | 280/149.2 |
| 2,839,311 | 6/1958 | Locker | 280/149.2 |
| 2,900,194 | 8/1959 | De Lay | 280/149.2 |
| 3,778,079 | 12/1973 | Vornberger et al. | 280/149.2 |
| 4,286,797 | 9/1981 | Mekosh et al. | 280/149.2 |
| 4,635,742 | 1/1987 | Bertolini | 280/149.2 |
| 4,838,566 | 6/1989 | Baxter et al. | 280/149.2 |
| 4,838,578 | 6/1989 | Baxter | 280/149.2 |
| 4,944,522 | 7/1990 | Hart | 280/149.2 |
| 5,346,233 | 9/1994 | Moser | 280/149.2 |

OTHER PUBLICATIONS

A photograph showing a spring-loaded sliding tandem suspension system.

Primary Examiner—Margaret A. Focarino
Assistant Examiner—Paul N. Dickson
Attorney, Agent, or Firm—Dougherty, Hessin, Beavers & Gilbert

[57] ABSTRACT

An apparatus which is attachable to and operable for unlocking existing, adjustable suspension systems. The apparatus comprises: a housing; a securing member for securing the housing on a suspension system actuating member; a spring member positioned in the housing and having a secured first end such that the first end of the spring is prevented from rotating in the housing; and a tensioning member associated with a second end of the spring. The tensioning member includes a tensioning member arm such that, by pivoting the tensioning member arm to a tensioning position with respect to the housing, the second end of the spring rotates with respect to the first end of the spring whereby the spring is tensioned. When the housing of the apparatus is secured on a suspension system actuating member and the tensioning arm is pivoted to its tensioning position, the apparatus will impart a force to the actuating member such that the suspension system locking member(s) is/are thereby urged to move to unlocked position.

13 Claims, 7 Drawing Sheets

ATTACHABLE APPARATUS FOR UNLOCKING ADJUSTABLE SUSPENSIONS

FIELD OF THE INVENTION

The present invention relates to devices which are attachable to and are operable for unlocking existing adjustable suspension systems. The present invention also relates to adjustable suspension systems having such devices attached thereto.

BACKGROUND OF THE INVENTION

Various types of truck trailers (e.g., semi-truck trailers) are commonly equipped with sliding tandem systems. A sliding tandem system provides a means for repositioning the rear axle(s) of a trailer to thereby redistribute the load weight being carried by the trailer axles.

As depicted in FIGS. 1–4, a sliding tandem system 2 will typically include: (a) a pair of fixed suspension rails 4 provided on the underframe of the trailer, each of said fixed rails 4 having a series of positioning holes or slots 6 provided therein; (b) a sliding suspension frame 8 slidably mounted on fixed suspension rails 4; and (c) a suspension locking assembly 10. A typical suspension locking assembly 10 will include: a plurality of (typically four) locking pins 12 which are selectively positionable in fixed rail positioning holes 6; springs or other biasing means 14 associated with locking pins 12 for biasing pins 12 toward their locked positions (i.e., toward engagement with fixed rail positioning holes 6); an elongate rotatable shaft 16 which extends parallel to fixed suspension rails 4; linkage assemblies 18 which operably associate locking pins 12 with elongate shaft 16 such that, by rotating shaft 16 about its longitudinal axis, locking pins 12 can be selectively extended or retracted; a crank arm 20 having the top end thereof connected to the end of elongate shaft 16; and a hand operated pin-pulling rod/member 22. Pin-pulling rod 22 is connected to the bottom end of crank arm 20 such that (a) by pulling rod 22, elongate shaft 16 is rotated to withdraw locking pins 12 from their locked positions and (b) by releasing rod 22, elongate shaft 16 is allowed to rotate in the opposite direction such that as a result of the force exerted by springs 14, locking pins 12 move into locking engagement with positioning holes 6.

A sliding tandem system 2 of the type depicted in FIGS. 1–4 will also typically include means for retaining locking pins 12 in their unlocked positions so that sliding suspension frame 8 can be repositioned on fixed suspension rails 4. Such retaining means will typically comprise notches 24 formed on pin-pulling rod 22. Notches 24 mate with the narrow portion of a keyhole slot 28 provided in the side of sliding suspension frame 8. At the same time that rod 22 is pulled to unlock pins 12, notched portion 24 of rod 22 can be secured in the narrow portion of keyhole slot 28 to thereby retain rod 22 in its pulled position.

Sliding tandem systems are disclosed, for example, in U.S. Pat. Nos. 2,900,194, 3,778,079, 4,838,566, and 4,838,578. The entire disclosure of each of these patents is incorporated herein by reference.

Unfortunately, when locking pins 12 are received in fixed rail positioning holes 6, the edges of positioning holes 6 tend to bind against locking pins 12 so that pins 12 cannot readily be removed therefrom. Consequently, a sliding tandem system of the type depicted in FIGS. 1–4 typically cannot be unlocked without the efforts of two people, one of whom is seated in the truck cab and the other of whom is positioned adjacent the rear axle(s) of the trailer. The person positioned in the truck cab rocks the trailer back and forth in order to free (i.e., unbind) the locking pins. At the same time, the person positioned adjacent the rear axle(s) continuously pulls pin-pulling rod 22 such that, at the brief instant when the locking pins are freed, pins 12 are pulled to their unlocked position.

As will thus be apparent, a need has existed for a pin pulling system which will allow one person, acting alone, to quickly and easily unlock a sliding suspension system. Oftentimes, particularly when on the road, a second person is not available to assist in the pin-pulling operation. Without the assistance of a second person, hours of effort may be required to unlock a sliding suspension system.

As will also be apparent, a need has existed for a pin pulling system which eliminates the need to have a person gripping the pin pulling rod while the trailer is rocked back and forth. The person gripping pin-pulling rod 22 during the unlocking operation is placed in great danger of being seriously injured by the trailer tires, the pin-pulling rod and/or the trailer body.

U.S. Pat. No. 4,838,566 discloses a modified sliding tandem system which can be unlocked without requiring that a second person operate the pin-pulling rod while the trailer is rocked back and forth. In one embodiment, the modified sliding tandem system of U.S. Pat. No. 4,838,566 is composed of: an extended, rotatable suspension shaft; a plate rigidly secured to the shaft at a location spaced apart from the end of the shaft; a crank arm rigidly attached to a spacer and received over the end of the suspension shaft such that the crank arm and spacer are able to rotate about the end portion of the shaft; a coil spring which encircles the spacer and has a first end secured to the plate and a second end secured to the crank arm; and a pin-pulling rod secured to the lower end of the crank arm. The pin-pulling rod is operable for pivoting the crank arm to thereby withdraw the suspension system locking pins. When the locking pins are stuck in extended position, the coil spring will deflect so that the pin-pulling rod can be pulled and secured in its pulled position. With the rod thus secured, the coil spring operates to urge the suspension shaft to rotate such that the locking pins will retract as soon as the binding forces holding the pins in locked position are released.

A second embodiment of the modified suspension system of U.S. Pat. No. 4,838,566 is composed of: an extended suspension shaft having a hollow end portion; a torsion bar-type spring secured in the hollow end portion of the shaft; a crank arm connected to the end of the torsion bar spring and rotably positioned on the end of the shaft; and a pin-pulling rod operably connected to the crank arm. If one or more of the locking pins is stuck, the bar spring will twist on its axis so that the rod can be pulled and the crank arm can be rotated independently of the shaft. The pin-pulling rod can then be secured in pull position whereby the bar spring will impart a continuous force to the shaft which urges the locking pins to retract as soon as the binding forces holding the pins in extended position are released.

Although the modified suspension systems of U.S. Pat. No. 4,838,566 represent clear improvements in the art, the U.S. Pat. No. 4,838,566 systems have various shortcomings. For example, the U.S. Pat. No. 4,838,566 suspension systems do not provide a mechanism which can be easily attached to, and used for unlocking, an existing sliding suspension system. Moreover, the conversion of an existing sliding suspension system to include features of the type disclosed in U.S. Pat. No. 4,838,566 would require numerous system modifications. Further, none of the assemblies disclosed in U.S. Pat. No. 4,838,566 provides an operational backup system which can be used in the event that the shaftrotating spring mechanism fails.

U.S. Pat. No. 4,838,578 also discloses a modified suspension system which can be unlocked without requiring that a second person operate a pin-pulling rod while the trailer is rocked back and forth. The system of U.S. Pat. No. 4,838,578 includes: an elongate cylindrical housing having a sidewall which is attached to the bottom end of an unlocking system crank arm; a pin-pulling rod received through an end of the cylindrical housing; and a coiled compression spring which encircles the pulling rod and is contained within the cylindrical housing. If one or more locking pins are stuck in extended position, the compression spring will deflect such that the pulling rod can be pulled and secured in its pulled position. With the rod thus secured in pulled position, the spring urges the cylindrical housing to move outwardly to recapture the pulling rod. The eventual outward movement of the cylindrical housing operates to pivot the crank arm whereby the suspension system is unlocked.

Compared to the systems of U.S. Pat. No. 4,838,566, the system of U.S. Pat. No. 4,838,578 can more readily be used to modify an existing sliding suspension assembly; however, the U.S. Pat. No. 4,838,578 system also has significant shortcomings. As is apparent from the drawings provided in U.S. Pat. No. 4,838,566 and in U.S. Pat. No. 4,838,578, the U.S. Pat. No. 4,838,578 system is not as sturdy and as reliably constructed as the U.S. Pat. No. 4,838,566 systems. Further, the U.S. Pat. No. 4,838,578 system does not provide an operational backup assembly which can be used in the event that the cylinder and spring assembly fails.

SUMMARY OF THE INVENTION

The present invention provides a sturdy, easily attachable apparatus for unlocking an existing, adjustable suspension system. The inventive apparatus fully resolves the problems and satisfies the needs discussed hereinabove.

The inventive apparatus is particularly well suited for attachment to an adjustable suspension system of the type comprising (a) at least one locking member and (b) an actuating member linked with the locking member such that, by pivoting the actuating member, the locking member can be selectively placed in a locked position or in an unlocked position. The inventive apparatus comprises: a housing; a securing means for securing the housing on the actuating member; a spring member at least partially positioned in the housing and having a secured first end such that said first end is prevented from rotating in the housing; and a tensioning member associated with a second end of the spring. The tensioning member includes a tensioning member arm such that, by pivoting the tensioning member arm to a tensioning position with respect to the housing, the second end of the spring rotates with respect to the first end of the spring whereby the spring is tensioned. When the housing of the inventive apparatus is secured on the actuating member and the tensioning arm is pivoted to said tensioning position, the inventive apparatus will impart a force to the actuating member such that the locking member is thereby urged to move to its unlocked position.

In another embodiment, the present invention provides an adjustable suspension comprising: a shaft having an end and having a longitudinal axis, wherein the adjustable suspension system can be locked and unlocked by rotating the shaft about its longitudinal axis; an actuating member rigidly secured to the end of the shaft such that the shaft can be rotated about its longitudinal axis by pivoting the actuating member; a housing secured on the actuating member; a spring member at least partially positioned in the housing and having a secured first end such that the first end of the spring is prevented from rotating in the housing; and a tensioning member associated with the second end of the spring. The tensioning member includes a tensioning member arm such that, by pivoting the tensioning member arm to a tensioning position with respect to the housing, the second end of the spring rotates with respect to the first end of the spring whereby the spring is tensioned. When the tensioning member arm is pivoted to its tensioning position, the resultant tensioning of the spring imparts a force to the actuating member such that the shaft is urged to rotate and thereby unlock the adjustable suspension system.

Further objects, features, and advantages of the present invention will be apparent to those skilled in the art upon reference to the accompanying drawings and upon reading the following description of the preferred embodiments.

DESCRIPTION OF THE PREFERRED EMBODIMENTS

Figure 1:
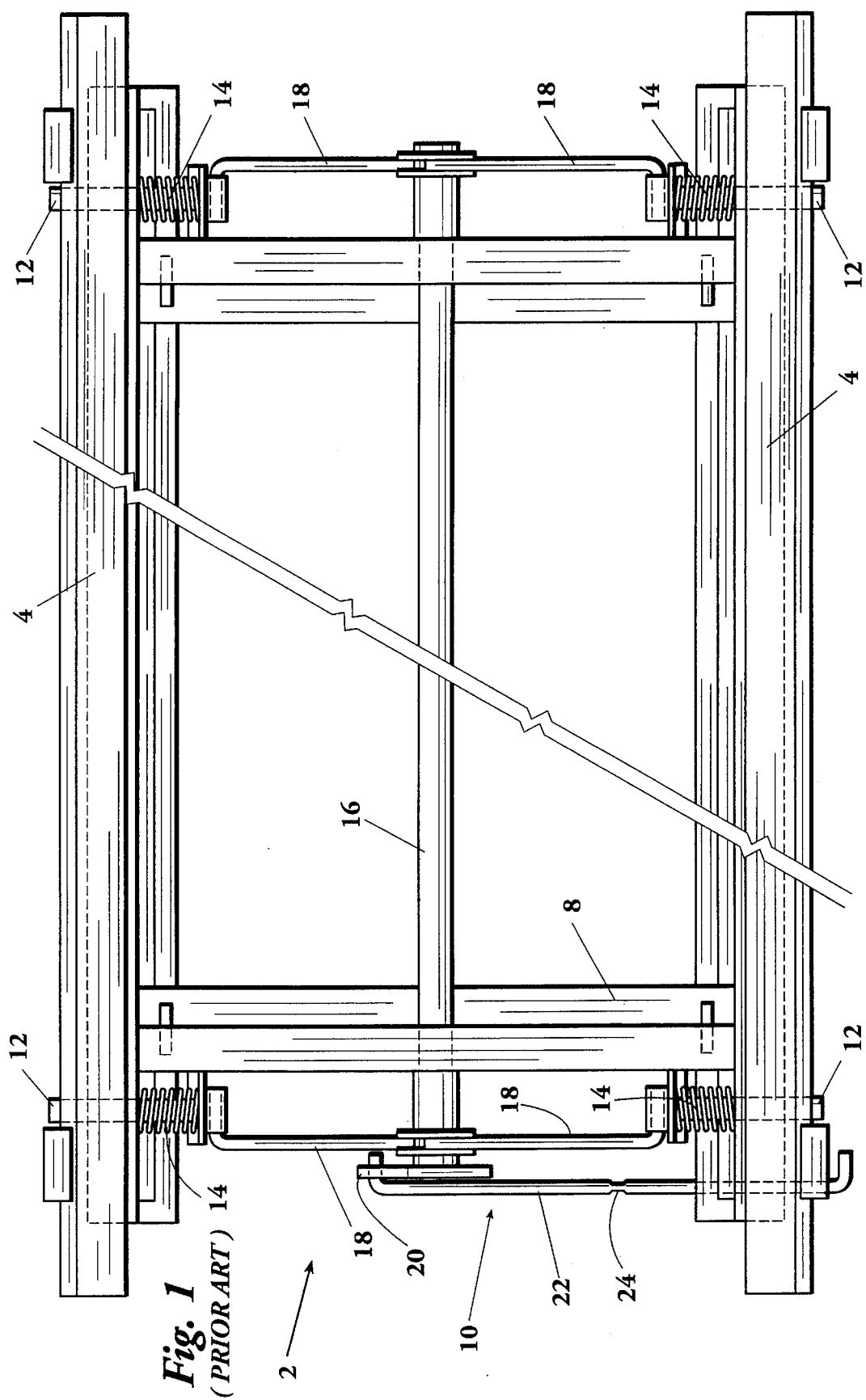
FIG. 1 provides a top view of a prior art sliding tandem system 2.
Figure 2:
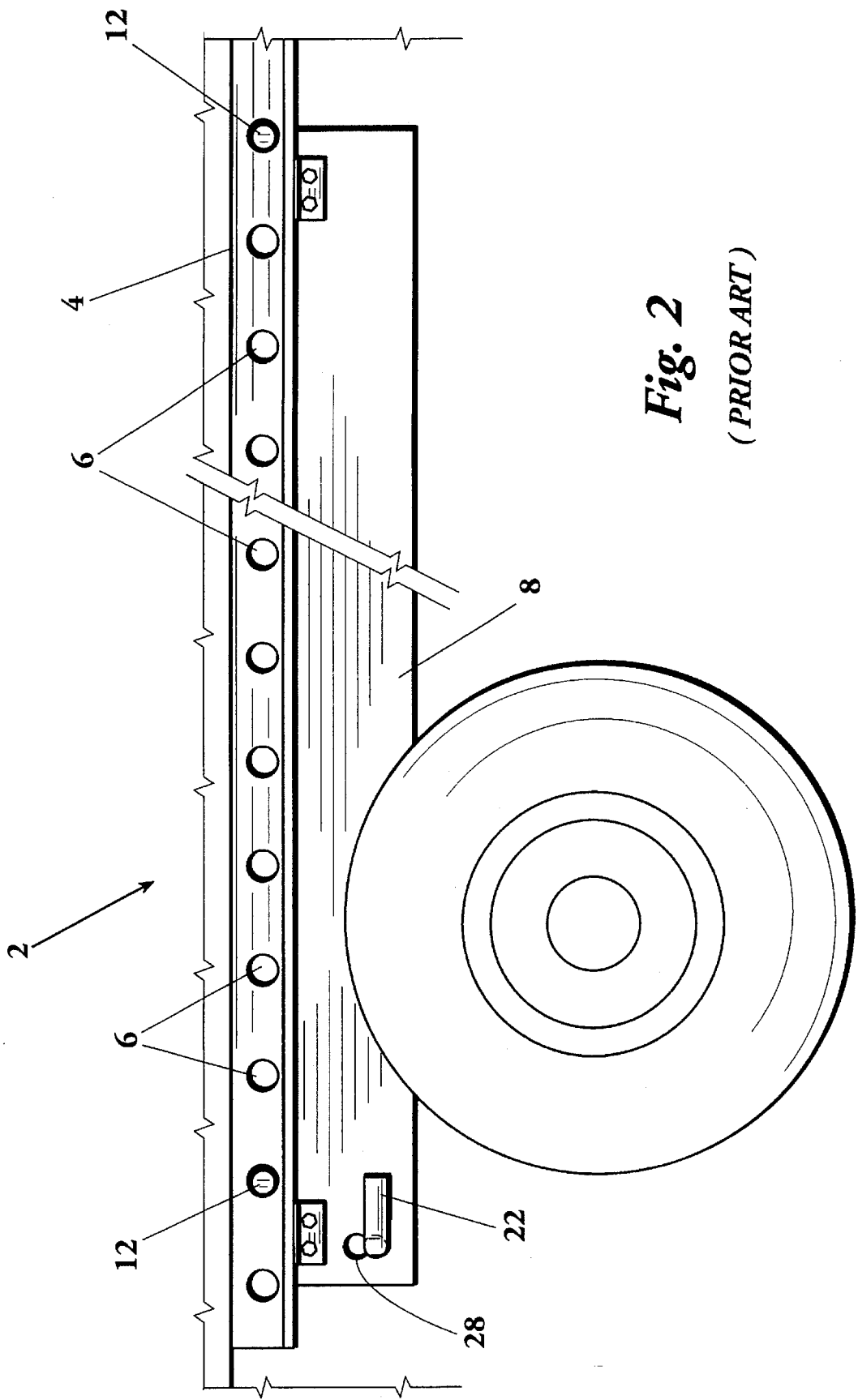
FIG. 2 provides a side view of prior art sliding tandem system 2.
Figure 3:
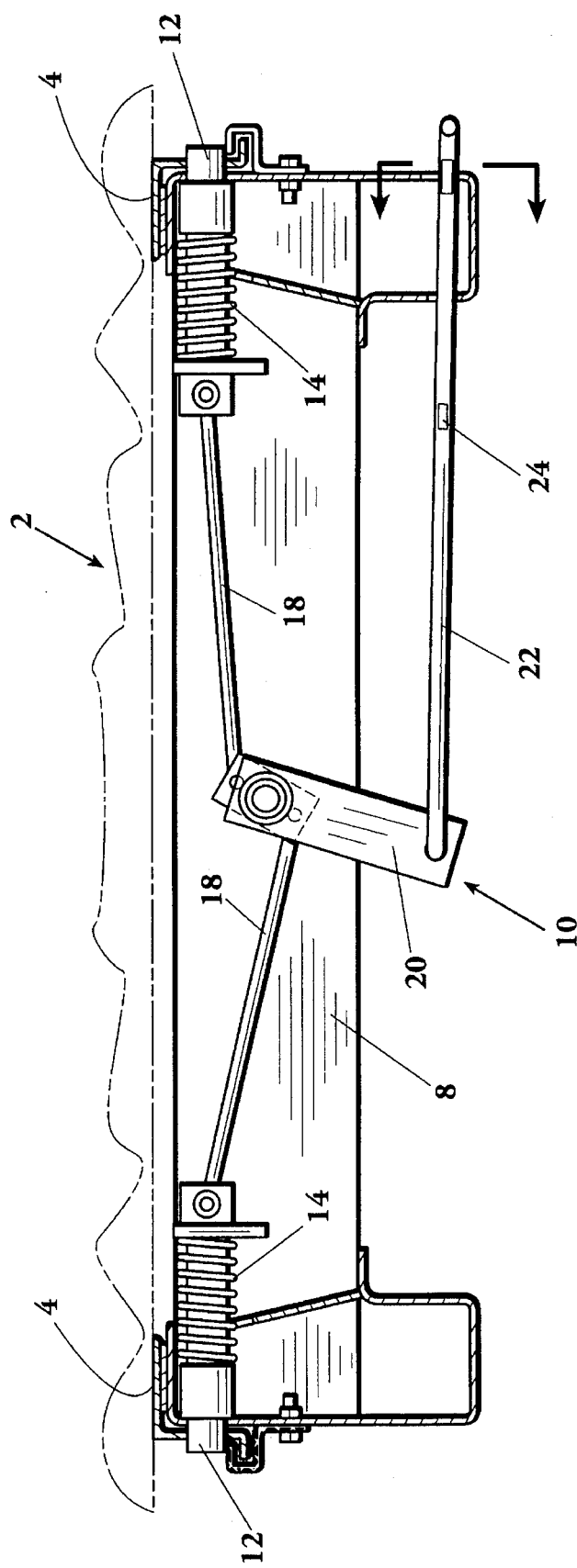
FIG. 3 provides a front end view of prior art sliding tandem system 2.
Figure 4:
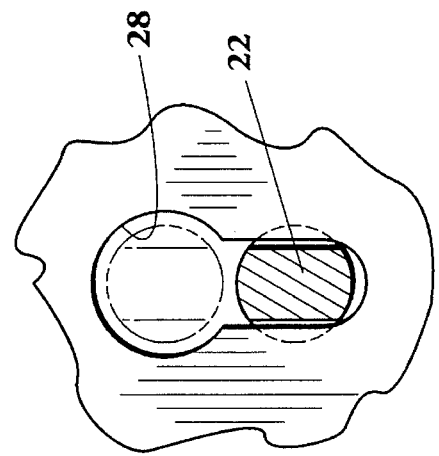
FIG. 4 provides a side view, taken from perspective 4—4 indicated in FIG. 3, of a keyhole slot 28 included in prior art sliding tandem system 2.

An embodiment 100 of the inventive, attachable apparatus is depicted in FIGS. 5–9. Inventive apparatus 100 comprises: a cylindrical housing 102 having a front end 104 and a back end 106; an attachment plate 108 rigidly secured to the back end 106 of housing 102; a coil spring 110 positioned in housing 102, coil spring 110 having a first end 112 and a second end 114; and a tensioning member 116, associated with the first end 112 of coil spring 110, for tensioning spring 110 within housing 102. Although cylindrical housing 102 is depicted as having a substantially solid cylindrical wall, it will be understood that housing 102 could optionally be a total or partial frame-type structure.

As indicated in FIGS. 5–9, attachment plate 108 is preferably configured such that plate 108 can be positioned directly on the crank arm 20 of an existing suspension locking system 10. Plate 108 can have various slots and apertures formed therein which will accommodate any obstructions existing on the surface of crank arm 20 and/or will allow plate 108 to be bolted to crank arm 20. Plate 108 will preferably be rigidly secured to crank arm 20 by bolting and/or welding.

As will be understood by those skilled in the art, attachment plate 108 can optionally be replaced with generally any type of structure which is operable for rigidly securing inventive apparatus 100 to crank arm 20. For example, plate 108 can be replaced with a structure which slides onto and can be bolted, welded, or otherwise rigidly secured to crank arm 20.

Coil spring 110 is preferably sized such that, when (a) spring 110 is tensioned to assist in moving pins 12 of locking assembly 10 to their unlocked position and (b) all binding/ sticking forces holding pins 12 in locked position are released, spring 110 will exert sufficient force to move locking pins 12 to their unlocked positions. Although a coil-type spring is preferred, it will be understood that spring 110 could alternatively be a torsion bar-type spring or generally any other type of spring member which is tensioned by twisting.

The second end 114 of coil spring 110 preferably includes an outwardly projecting end portion 118 which extends through an aperture 120 formed in the cylindrical wall of housing 102. The extension of end portion 118 through aperture 120 operates to prevent the second end 114 of coil spring 110 from rotating within housing 102. Securing end 114 of spring 110 within housing 102 in the manner just described allows spring 110 to be tensioned by pivoting tensioning member 116.

Tensioning member 116 comprises a spring grasping piece 122 and a tensioning arm 125. Spring grasping piece 122 includes a first cylindrical portion 124 and a second cylindrical portion 126 which extends from first cylindrical portion 124. The diameter of first cylindrical portion 124 is larger than the diameter of second cylindrical portion 126 such that the transition between portions 124 and 126 defines an exterior radially shoulder 128. Grasping piece 122 also includes a cavity/groove 130 extending into the end of first cylindrical portion 124. Groove 130 is sized for receiving a laterally extending first end portion 132 of coil spring 110.

Figure 8:
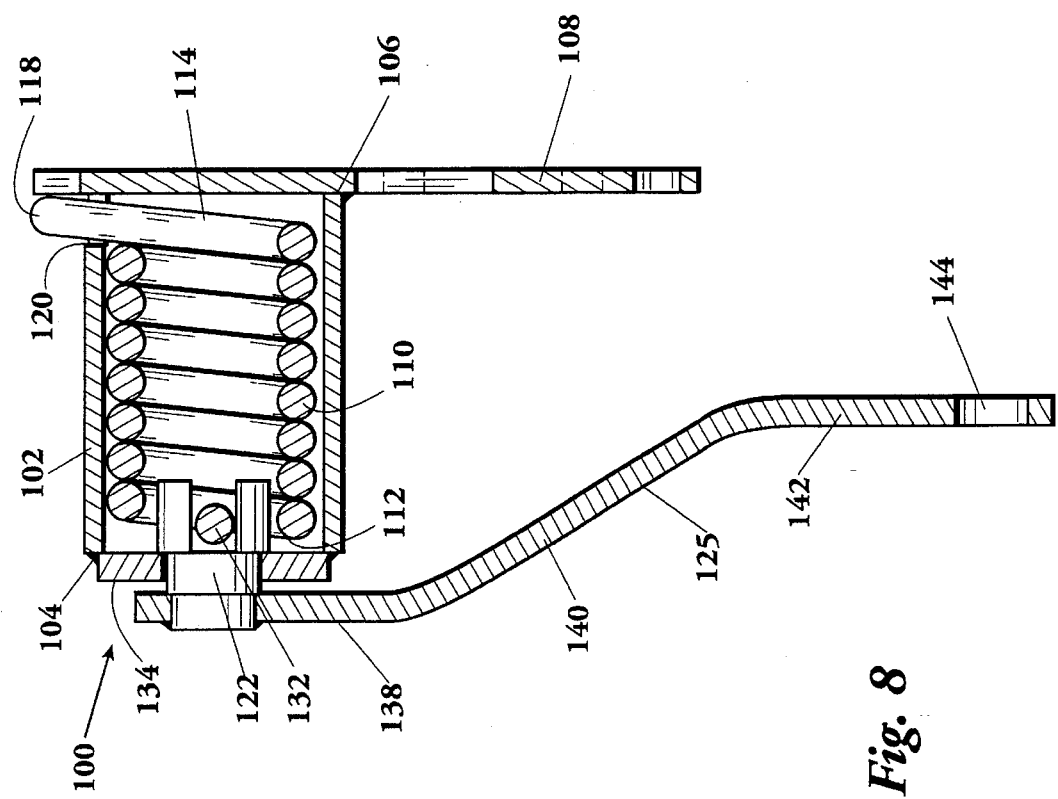
FIG. 8 provides a cut-away side view of inventive apparatus 100 taken from perspective 8—8 shown in FIG. 7.
Figure 7:
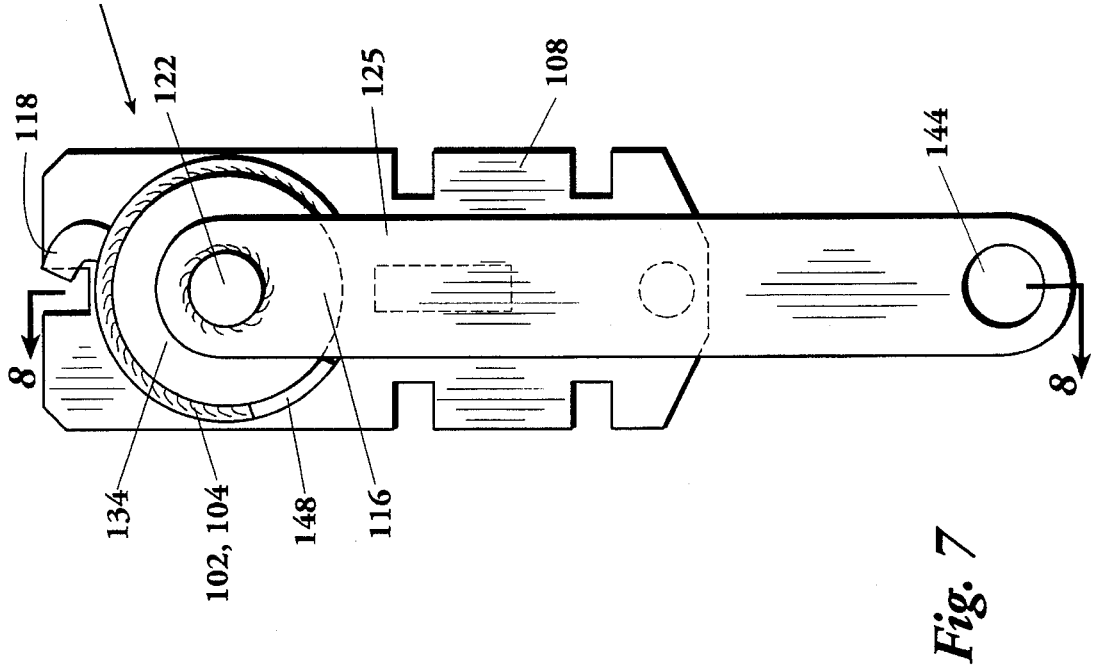
FIG. 7 provides an elevational front view of inventive apparatus 100.
Figure 9:
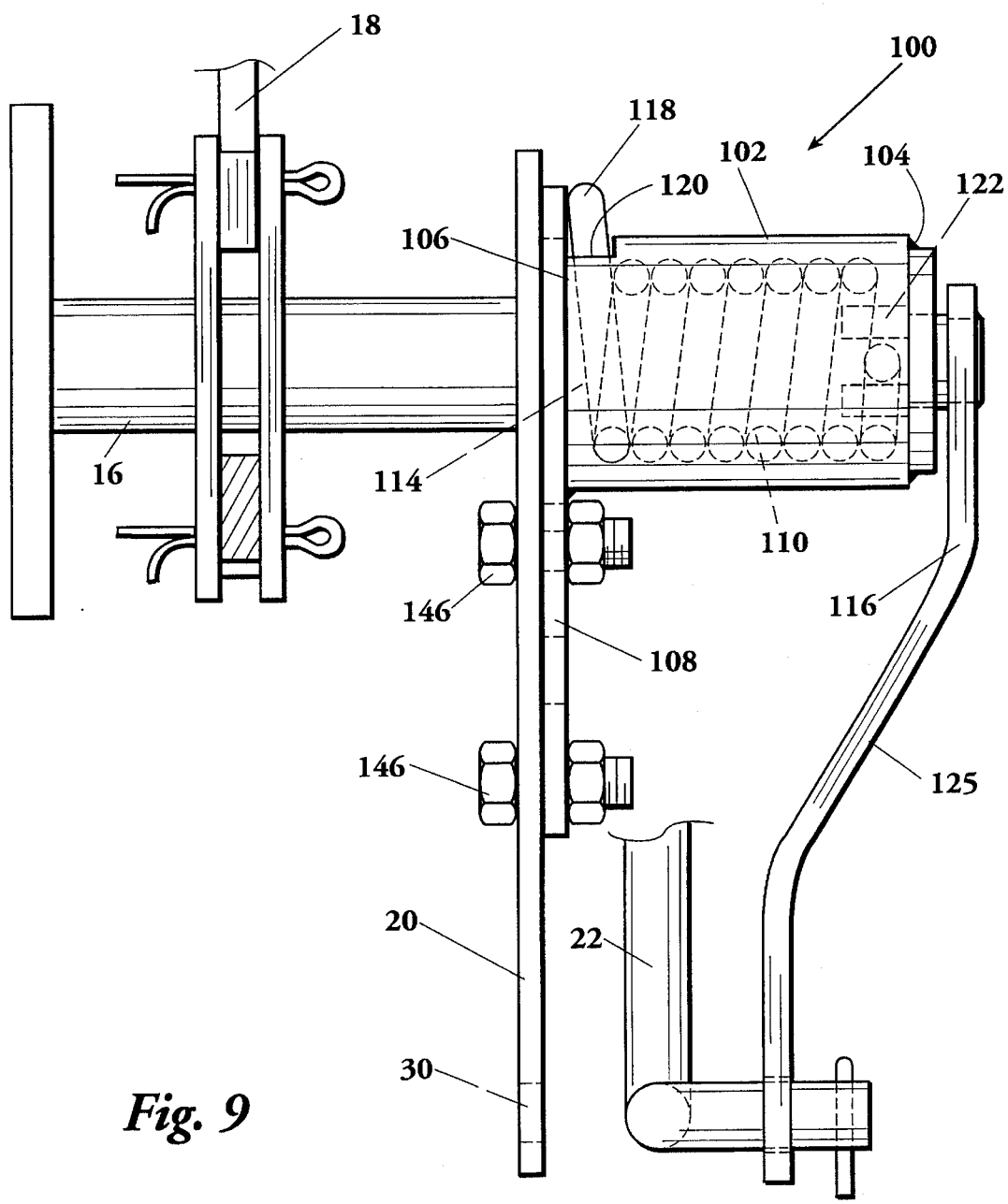
FIG. 9 provides an elevational side view of inventive apparatus 100 secured to sliding tandem system 2.

The first cylindrical portion 124 of grasping piece 122 is rotatably held in housing 102 by means of a circular plate 134. As shown in FIGS. 7–9, circular plate 134 is preferably welded to the front end 104 of cylindrical housing 102. The second cylindrical portion 126 of grasping piece 122 projects outwardly through a circular aperture 136 provided in the center of circular plate 134. The diameter of aperture 136 is smaller than the diameter of grasping piece cylindrical portion 124 but larger than the diameter of grasping piece cylindrical portion 126 such that (a) grasping piece 122 is allowed to rotate within aperture 136 but (b) first cylindrical portion 124 of grasping piece 122 is retained in housing 102 by the contact of radial shoulder 128 with the interior surface of circular plate 134.

Tensioning arm 125 is rigidly attached to the projecting end of grasping piece 122 by welding or by other suitable means. Tensioning arm 125 is preferably configured to include: an upper end portion 138 which is attached to grasping piece 122 and which, when inventive apparatus 100 is secured on crank arm 20, will extend substantially parallel to crank arm 20; an inwardly angled center portion 140 which extends from the bottom of portion 138; and a lower end portion 142 which extends from the bottom of center portion 140 and which will also extend substantially parallel to crank arm 20. An aperture 144 is provided in the lower end portion 142 of tensioning arm 125 for connecting an existing pin-pulling rod 22 to tensioning arm 125.

Tensioning arm 125 is preferably configured in the manner just described so that, when inventive apparatus 100 is attached to crank arm 20, tensioning arm aperture 144 will be positioned in close proximity to the pulling rod-connecting aperture 30 provided in the lower end of the crank arm 20. Positioning tensioning arm aperture 144 in close proximity to crank arm aperture 30 allows pin-pulling rod 22 to be interchangeably connected to tensioning arm 125 or to crank arm 20. Thus, if for some reason inventive apparatus 100 ceases to function properly, pulling rod 22 can be reconnected to crank arm 20 and suspension locking assembly 10 can be operated in the same manner as prior to the attachment of inventive apparatus 100 thereto.

FIG. 9 depicts inventive apparatus 100 attached to crank arm 20 by means of bolts 146. After attaching apparatus 100 to crank arm 20, pin-pulling rod 22 is disconnected from crank arm 20 and attached to tensioning arm 125 by means of aperture 144. As also shown in FIG. 9, inventive apparatus 100 is preferably positioned on crank arm 20 such that the second end 114 of coil spring 110 is positioned substantially directly opposite the end of locking assembly shaft 16.

With inventive apparatus 100 secured to crank arm 20 in the manner depicted in FIG. 9, sliding tandem system 2 can be unlocked by pulling rod 22. If locking pins 12 happen to be stuck in locked position, coil spring 110 will deflect sufficiently to allow rod 22 to be secured, by means of notches 24, in pulled position. With pulling rod 22 thus secured, coil spring 110 imparts a continuous force to crank arm 20 which urges pins 12 to retract to their unlocked positions.

While coil spring 110 is tensioned in the manner just described, the trailer can be rocked back and forth so that the binding forces holding pins 12 in locked position are released. As soon as these binding forces are released, coil spring 110 will cause housing 102, crank arm 20 and locking assembly shaft 16 to rotate such that locking pins 12 are retracted to their unlocked positions.

When pulling rod 22 is released from its pulled position, crank arm 20 will pivot in unison with tensioning arm 125 as pins 12 move to their locked positions. Moreover, if pins 12 are not stuck in locked position, crank arm 20 will pivot simultaneously and in unison with tensioning arm 125 when rod 22 is pulled to its pin-unlocking position.

Figure 5:
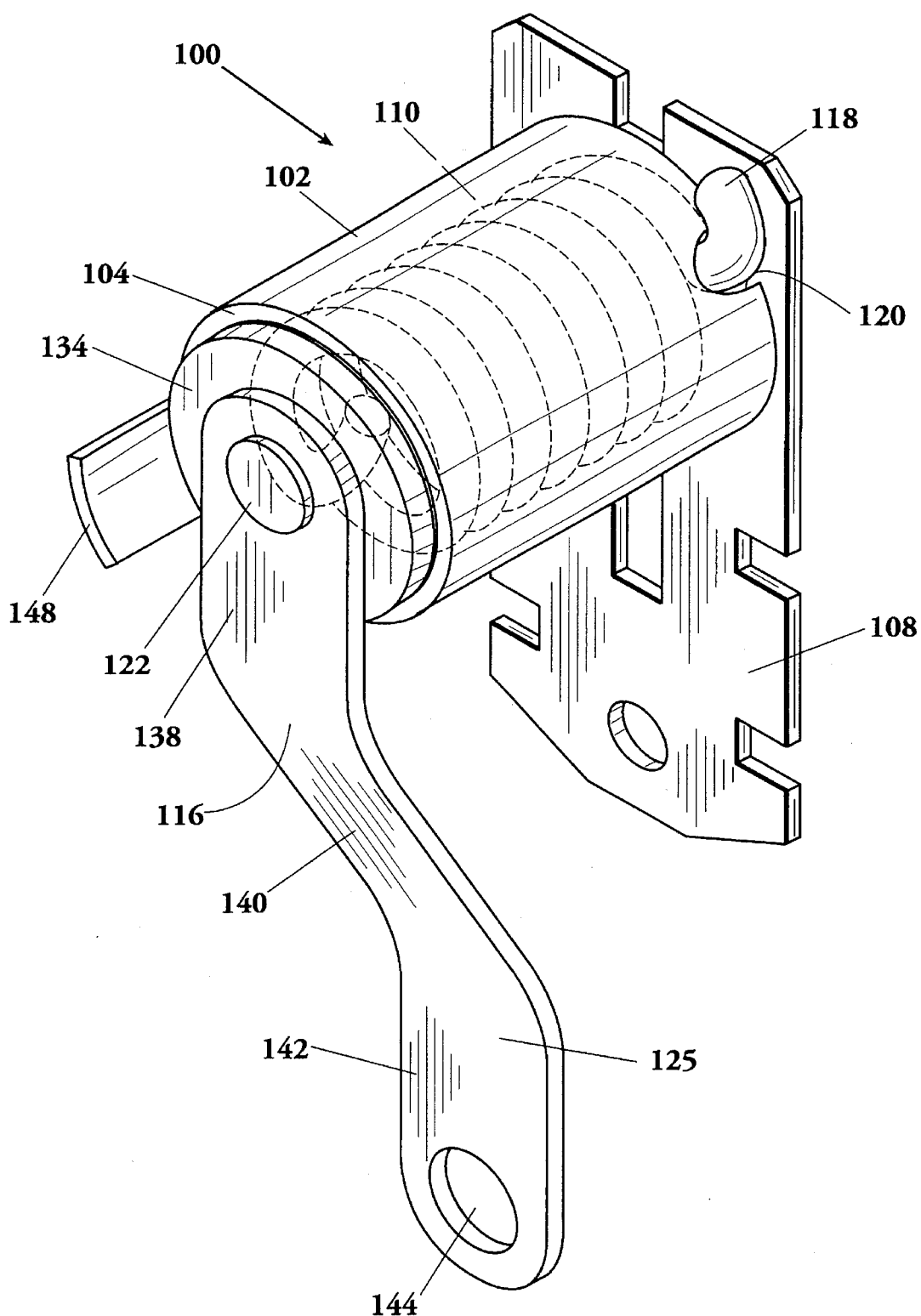
FIG. 5 provides a perspective view of an attachable pin-pulling apparatus 100 provided by the present invention.
Figure 6:
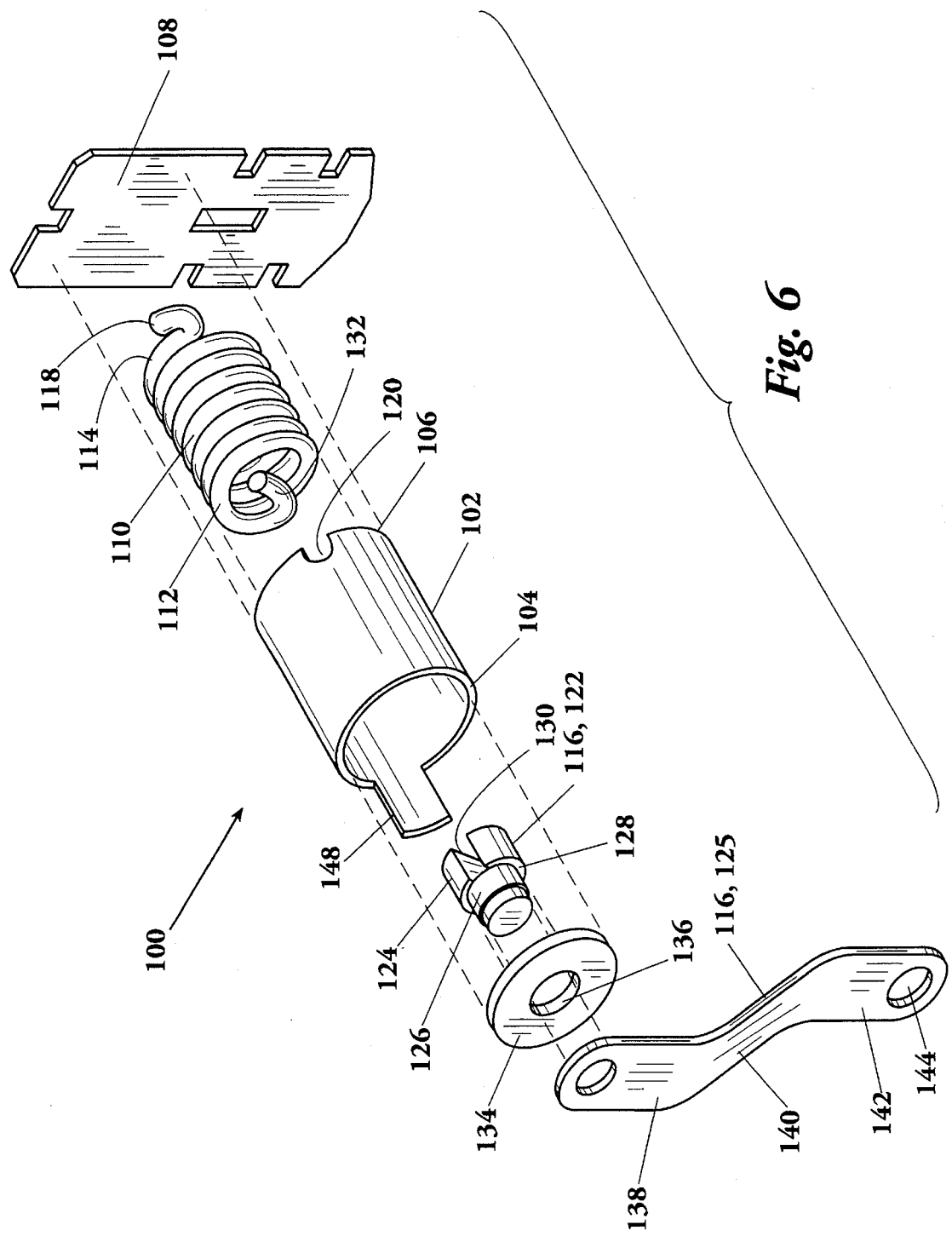
FIG. 6 provides an exploded view of inventive apparatus 100.

As shown in FIGS. 5–7, an outwardly projecting lip 148 is also preferably provided on the front end 104 of cylindrical housing 102. Lip 148 engages tensioning arm 125 and preferably holds tensioning arm 125 in a slightly deflected position. A small amount of tension is thereby continuously maintained on coil spring 110 so that inventive apparatus 100 is prevented from chattering.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus attachable to an existing, operable adjustable suspension system for facilitating the adjustment of said adjustable suspension system, said adjustable suspension system comprising at least one locking member, a pivotable operating lever, and a linkage assembly connected between said locking member and said operating lever such that, by pivoting said operating lever said locking member is selectively positionable in a locked position or in an unlocked position, said apparatus comprising:

a housing;

a spring member at least partially positioned in said housing and having a secured first end such that said first end of said spring member is prevented from rotating in said housing; and a tensioning member associated with a second end of said spring member and including a tensioning member arm such that, by pivoting said tensioning member arm to a tensioning position with respect to said housing, said second end of said spring member rotates with respect to said first end of said spring member whereby said spring member is tensioned, said apparatus being a self-contained, independent apparatus which does not include any portion of said linkage assembly and does not include said operating lever, said apparatus further comprising a securing means for securing said housing to said operating lever of said existing adjustable suspension system, and wherein, when said housing is secured on said operating lever and said tensioning member arm is pivoted to said tensioning position, said apparatus will impart a force to said operating lever such that said locking member is thereby urged to move to said unlocked position.

2. The apparatus of claim 1 wherein: an aperture is provided in a wall of said housing; said spring member is a coil spring; and said first end of said coil spring is secured by positioning said coil spring in said housing such that an outwardly projecting portion of said first end of said coil spring extends through said aperture.

3. The apparatus of claim 1 wherein:

said existing adjustable suspension system further comprises a hand operating member connected to said operating lever and said tensioning member arm includes means for operably connecting said hand operating member thereto such that, when said housing is secured on said operating lever and said hand operating member is disconnected from said operating lever, said hand operating member can be connected to said tensioning member arm and used (a) for pivoting said tensioning member arm to said tensioning position when said locking member is stuck in said locked position and (b) for simultaneously pivoting said tensioning member arm and said operating lever when said locking member is not stuck in said locked position.

4. The apparatus of claim 3 wherein said securing means is operable for securing said housing on said operating lever in a manner such that, while said housing is secured on said operating lever, said hand operating member can be interchangeably connected to said tensioning member arm and to said operating lever.

5. An adjustable suspension system comprising:

a shaft having an end and having a longitudinal axis, wherein said adjustable suspension system can be locked and unlocked by rotating said shaft about said longitudinal axis;

an actuating member rigidly secured to said end of said shaft such that said shaft can be rotated about said longitudinal axis by pivoting said actuating member;

a housing secured on said actuating member;

a spring member at least partially positioned in said housing and having a secured first end such that said first end of said spring member is prevented from rotating in said housing; and a tensioning member associated with a second end of said spring member and including a tensioning member arm such that, by pivoting said tensioning member arm to a tensioning position with respect to said housing, said second end of said spring member rotates with respect to said first end of said spring member whereby said spring member is tensioned, wherein, when said tensioning member arm is pivoted to said tensioning position, the resultant tensioning of said spring member will impart a force to said actuating member such that said shaft is urged to rotate and thereby unlock said adjustable suspension system, said actuating member having a first side which is connected to said end of said shaft;

said actuating member having a second side whereon said housing is positioned;

said first side of said actuating member being positioned substantially opposite said second side of said actuating member; and said housing being positioned on said second side of said actuating member such that said first end of said spring member is positioned substantially directly opposite said end of said shaft.

6. The adjustable suspension system of claim 6 wherein: said housing is secured on said actuating member by bolting.

7. The adjustable suspension system of claim 6 wherein an aperture is provided in a wall of said housing; said spring member is a coil spring; and said first end of said coil spring is secured by positioning said coil spring in said housing such that an outwardly projecting portion of said first end of said coil spring extends through said aperture.

8. The adjustable suspension system of claim 5 wherein:

said second end of said spring member includes an end portion;

said tensioning member comprises a spring grasping portion which rotatably extends into said housing and has a cavity provided therein wherein said end portion of said spring member is received; and said tensioning member arm extends from said spring grasping portion.

9. The adjustable suspension system of claim 5 further comprising a hand operating member connected to said tensioning member arm such that said hand operating member can be operated for pivoting said tensioning member arm to said tensioning position when said adjustable suspension is stuck in a locked position.

10. The apparatus of claim 9 wherein said housing is secured on said actuating member in a manner and said tensioning member arm is configured such that said hand operating member can be interchangeably connected to said tensioning member arm and to said actuating member.

11. An apparatus for facilitating the adjustment of an adjustable suspension system, said adjustable suspension system comprising at least one locking member and an actuating member linked with said locking member such that said locking member is selectively positionable in a locked position or in an unlocked position by operating said actuating member, said apparatus comprising:

a housing;

a securing means for securing said housing on said actuating member, said securing means comprising a plate which is positionable on said actuating member;

a spring member at least partially positioned in said housing and having a secured first end such that said first end of said spring member is prevented from rotating in said housing; and a tensioning member associated with a second end of said spring member and including a tensioning member arm such that, by pivoting said tensioning member arm to a tensioning position with respect to said housing, said second end of said spring member rotates with respect to said first end of said spring member whereby said spring member is tensioned, wherein, when said housing is secured on said actuating member and said tensioning member arm is pivoted to said tensioning position, said apparatus will impart a force to said actuating member such that said locking member is thereby urged to move to said unlocked position.

12. The apparatus of claim 11 wherein said plate is attachable to said actuating member by bolting.

13. An apparatus for facilitating the adjustment of an adjustable suspension system, said adjustable suspension system comprising at least one locking member and an actuating member linked with said locking member such that said locking member is selectively positionable in a locked position or in an unlocked position by operating said actuating member, said apparatus comprising:

a housing;

a securing means for securing said housing on said actuating member;

a spring member at least partially positioned in said housing and having a secured first end such that said first end of said spring member is prevented from rotating in said housing; and a tensioning member associated with a second end of said spring member and including a tensioning member arm such that, by pivoting said tensioning member arm to a tensioning position with respect to said housing, said second end of said spring member rotates with respect to said first end of said spring member whereby said spring member is tensioned, wherein, when said housing is secured on said actuating member and said tensioning member arm is pivoted to said tensioning position, said apparatus will impart a force to said actuating member such that said locking member is thereby urged to move to said unlocked position, said second end of said spring member including an end portion, said tensioning member comprising a spring grasping portion which rotatably extends into said housing and has a cavity provided therein wherein said end portion of said spring member is received; and said tensioning member arm extending from said spring grasping portion.

* * * * *